(12) United States Patent
Yamauchi et al.

(10) Patent No.: US 12,160,126 B2
(45) Date of Patent: Dec. 3, 2024

(54) IN-VEHICLE BATTERY SYSTEM

(71) Applicants: HITACHI ASTEMO, LTD., Hitachinaka (JP); NISSAN MOTOR CO., LTD., Yokohama (JP)

(72) Inventors: Tatsumi Yamauchi, Hitachinaka (JP); Akihiro Machida, Hitachinaka (JP); Toyoki Iguchi, Atsugi (JP); Hiroaki Saitou, Atsugi (JP); Hiroaki Hashimoto, Atsugi (JP); Akihiro Nomura, Atsugi (JP)

(73) Assignees: HITACHI ASTEMO, LTD., Hitachinaka (JP); NISSAN MOTOR CO., LTD., Yokohama (JP)

( * ) Notice: Subject to any disclaimer, the term of this patent is extended or adjusted under 35 U.S.C. 154(b) by 260 days.

(21) Appl. No.: 17/780,383

(22) PCT Filed: Sep. 25, 2020

(86) PCT No.: PCT/JP2020/036482
§ 371 (c)(1),
(2) Date: May 26, 2022

(87) PCT Pub. No.: WO2021/106345
PCT Pub. Date: Jun. 3, 2021

(65) Prior Publication Data
US 2022/0416552 A1 Dec. 29, 2022

(30) Foreign Application Priority Data
Nov. 27, 2019 (JP) .................................. 2019-214100

(51) Int. Cl.
*H02J 7/00* (2006.01)
*H01M 10/42* (2006.01)

(52) U.S. Cl.
CPC ......... *H02J 7/0031* (2013.01); *H01M 10/425* (2013.01); *H02J 7/0047* (2013.01);
(Continued)

(58) Field of Classification Search
CPC ...... H02J 7/0031; H02J 7/0047; H02J 7/0068; H02J 2207/20; H01M 10/425; H01M 2010/4271; H01M 2220/20
(Continued)

(56) References Cited

U.S. PATENT DOCUMENTS

2006/0158794 A1    7/2006  Behringer
2010/0299008 A1*  11/2010  Mitsutani ............... B60K 6/365
                                                            701/22

(Continued)

FOREIGN PATENT DOCUMENTS

JP    2000-209774 A    7/2000
JP    2012-217276 A   11/2012
(Continued)

OTHER PUBLICATIONS

Office Action issued in corresponding Japanese Patent Application No. 2021-561186, with English Machine Translation dated Feb. 28, 2023 (8 pages).
International Search Report with English translation and Written Opinion issued in corresponding international application PCT/JP2020/036482 mailed Nov. 10, 2020.
(Continued)

*Primary Examiner* — Michael R. Fin
(74) *Attorney, Agent, or Firm* — FOLEY & LARDNER LLP

(57) ABSTRACT

An in-vehicle battery system comprises: a battery; a relay for establishing or cutting off an electrical connection between the battery and an inverter; a plurality of switches respectively provided in a current path for switching the relay; and a battery control apparatus that supervises a status of the battery. The plurality of switches include a first switch provided in the battery control apparatus and a second (Continued)

switch provided in a vehicle control apparatus which controls traveling of the vehicle; the first switch and the second switch are serially connected to each other in the current path; the battery control apparatus controls a status of switching the first switch; and the vehicle control apparatus controls a status of switching the second switch.

6 Claims, 6 Drawing Sheets

(52) U.S. Cl.
CPC ... *H02J 7/0068* (2013.01); *H01M 2010/4271* (2013.01); *H01M 2220/20* (2013.01); *H02J 2207/20* (2020.01)

(58) Field of Classification Search
USPC ........................................ 307/10.1, 10.6, 10.7
See application file for complete search history.

(56) References Cited

U.S. PATENT DOCUMENTS

| | | | |
|---|---|---|---|
| 2017/0015205 A1* | 1/2017 | Ahn | ................... B60R 25/403 |
| 2017/0106765 A1* | 4/2017 | Kim | ........................ B60L 3/04 |
| 2018/0246169 A1 | 8/2018 | Miura et al. | |

FOREIGN PATENT DOCUMENTS

| | | |
|---|---|---|
| JP | 2013-089411 A | 5/2013 |
| JP | 2013-240165 A | 11/2013 |
| JP | 2017-079107 A | 4/2017 |
| WO | WO 2017/043238 A1 | 3/2017 |

OTHER PUBLICATIONS

Extended European Search Report issued in corresponding EP Application No. 20891995.1, dated Dec. 5, 2023 (7 pages).

* cited by examiner

IN-VEHICLE BATTERY SYSTEM

TECHNICAL FIELD

The present invention relates to an in-vehicle battery system.

BACKGROUND ART

There is known a battery module configured by: configuring an assembled battery by connecting a plurality of secondary battery cells (single batteries) such as lithium-ion batteries serially or in a serial-parallel manner; and further connecting a plurality of assembled batteries serially or in a serial-parallel manner. Generally, with an electrically driven vehicle such as an electric automobile or a hybrid vehicle, a battery (high voltage battery) which is configured by connecting a plurality of the above-described battery modules serially or in a serial-parallel manner is used as an electric storage apparatus together with a battery control apparatus for controlling each battery module. The electrically driven vehicle travels by having an inverter convert high-voltage direct-current power, which is supplied from the electric storage apparatus, into alternating-current power and using this alternating-current power to drive a motor. Moreover, the alternating-current power generated by regenerative electric power generation of the motor is converted into the direct-current power by the inverter and the electric storage apparatus is electrically charged by supplying this direct-current power to the electric storage apparatus.

With an electrically driven vehicle in which the above-described electric storage apparatus is mounted, high voltage relays for establishing or cutting off an electrical connection between the battery and the inverter are provided between the inverter and a positive electrode side and a negative electrode side of the battery, respectively. Furthermore, there may be a case where a precharge relay is included, to which the relay on either its positive electrode side or its negative electrode side is parallelly connected and a current limiting resistor is serially connected. With the electrically driven vehicle equipped with the precharge relay, the precharge relay is firstly electrically connected upon activation of a system in order to limit an inrush current and then the high voltage relay is electrically connected and the precharge relay is cut off.

Typically, the electrically driven vehicle in which the electric storage apparatus configured by using the lithium-ion batteries is mounted is equipped with a system for preventing the batteries from becoming overcharged or overdischarged in order to use the lithium-ion batteries safely. Furthermore, in recent years, the application of functional safety standards such as ISO26262 has been being promoted in response to an increased demand for the functional safety of vehicles. In this case, with the electrically driven vehicle in which the electric storage apparatus configured by using the lithium-ion batteries is mounted, it is required to secure the safety by reliably cutting off the connection between the battery/batteries and the inverter when an electronic circuit fails.

PTL 1 is known as a conventional technology related to this technical field. PTL 1 discloses a relay control circuit for turning on a relay so as to continue supplying electric power from a high voltage battery only when both an output signal of a vehicle control apparatus and an output signal of a battery control apparatus are signals to issue an instruction to continue supplying the electric power.

CITATION LIST

Patent Literature

PTL 1: Japanese Patent Application Laid-Open (Kokai) Publication No. 2013-240165

SUMMARY OF THE INVENTION

Problems to be Solved by the Invention

Regarding the relay control circuit described in PTL 1, AND circuits for outputting a logical product of the output signal of the vehicle control apparatus and the output signal of the battery control apparatus are connected respectively to two relays and ON/OFF of each relay is controlled by using output signals from theses AND circuits. Accordingly, if either one of the AND circuits fails, there is a possibility that the relays can no longer be switched. Particularly, with the electric storage apparatus using the lithium-ion batteries, if the relay is kept in an ON state, the battery/batteries may become overcharged or overdischarge; and, therefore, a problem occurs when the relay cannot be switched from ON to OFF. Consequently, the conventional technology has the problem of the possibility of causing the battery to be overcharged or overdischarged when a failure occurs at the circuit controlling the relay which establishes or cuts off the electrical connection between the battery and the inverter.

Means to Solve the Problems

An in-vehicle battery system according to the present invention, which is a battery system connected to an inverter mounted in a vehicle to give and receive direct-current power to and from the inverter, comprises: a battery; a relay for establishing or cutting off an electrical connection between the battery and the inverter; a plurality of switches respectively provided in a current path for switching the relay; and a battery control apparatus that supervises a status of the battery. The plurality of switches include a first switch provided in the battery control apparatus and a second switch provided in a vehicle control apparatus which controls traveling of the vehicle; the first switch and the second switch are serially connected to each other in the current path; the battery control apparatus controls a status of switching the first switch; and the vehicle control apparatus controls a status of switching the second switch.

Advantageous Effects of the Invention

Even if a failure occurs at either one of the battery control apparatus and the vehicle control apparatus which respectively control the relay to establish or cut off the electrical connection between the battery and the inverter, it is possible to reliably prevent the battery from becoming overcharged or overdischarged according to the present invention.

DESCRIPTION OF EMBODIMENTS

Embodiments of the present invention will be described below with reference to the drawings.

First Embodiment

Figure 1:
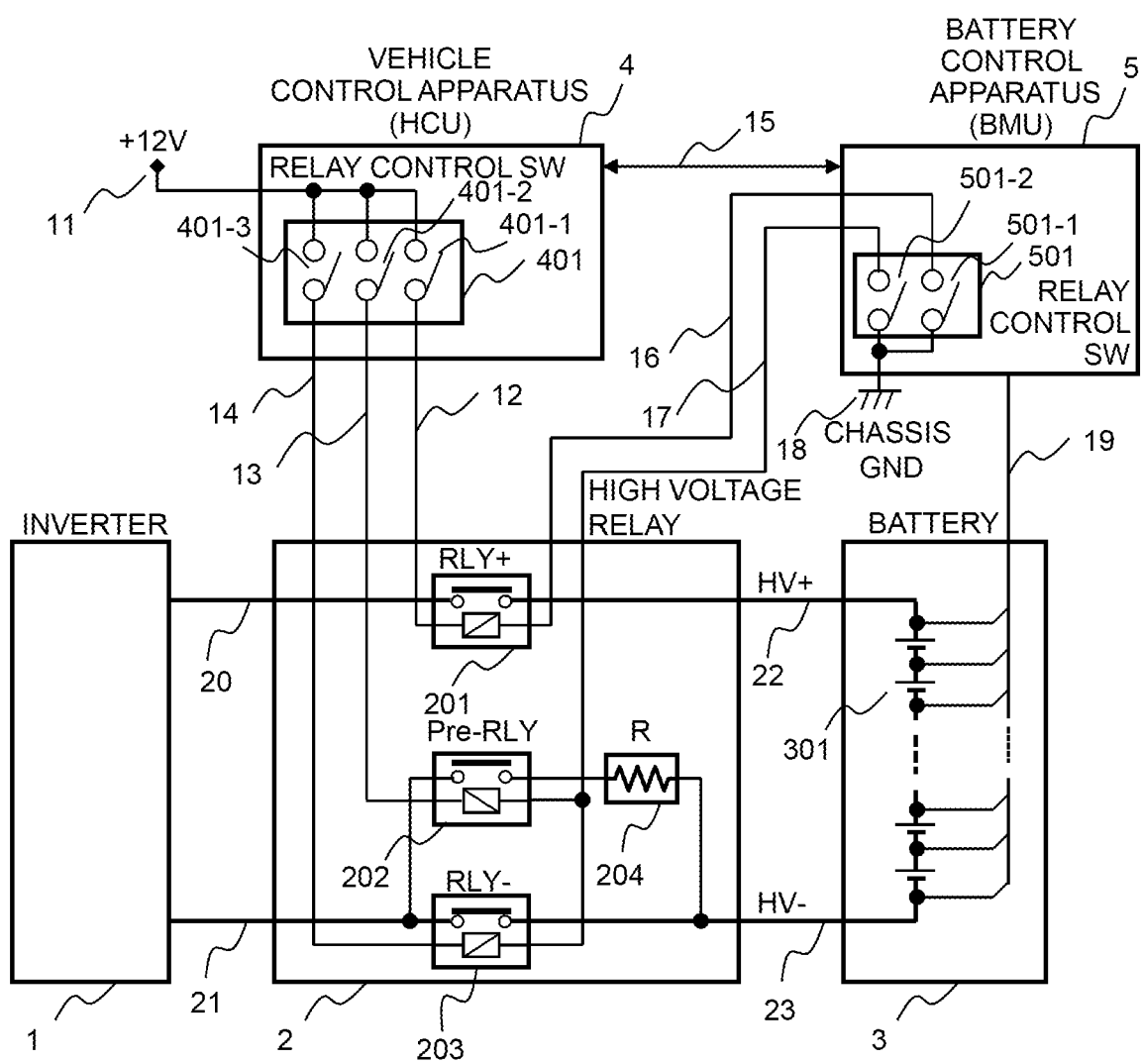
FIG. 1 is a diagram illustrating the configuration of a battery system according to a first embodiment of the present invention.

FIG. 1 is a diagram illustrating the configuration of a battery system according to a first embodiment of the present invention. The battery system illustrated in FIG. 1 is connected to an inverter 1 mounted in a vehicle and gives/receives direct-current power to/from the inverter 1 and includes a high voltage relay 2, a battery 3, a vehicle control apparatus 4, and a battery control apparatus 5. The vehicle control apparatus 4 and the battery control apparatus 5 are connected to each other via a CAN (Controller Area Network) communication line 15 provided inside the vehicle.

The inverter 1 converts direct-current power into alternating-current power, and vice versa, mutually between a motor, which is provided in the vehicle and is not illustrated in the drawing, and the battery 3. Specifically speaking, the direct-current power supplied from the battery 3 is converted into the alternating-current power by the inverter 1 and is output to the motor. Furthermore, the alternating-current power supplied from the motor is converted into the direct-current power by the inverter 1 and is output to the battery 3.

The high voltage relay 2 is connected between the inverter 1 and the battery 3 and includes a positive-electrode-side relay 201, a negative-electrode-side relay 203, a precharge relay 202, and a precharge resistor 204. The positive-electrode-side relay 201 is connected between a plus-side wire 20 for the inverter 1 and a plus-side wire 22 for the battery 3. The negative-electrode-side relay 203 is connected between a minus-side wire 21 for the inverter 1 and a minus-side wire 23 for the battery 3. The precharge relay 202 is connected parallelly with the negative-electrode-side relay 203 between the minus-side wire 21 for the inverter 1 and the minus-side wire 23 for the battery 3. The precharge resistor 204 is connected serially with the precharge relay 202.

Exciting coils for switching the positive-electrode-side relay 201, the precharge relay 202, and the negative-electrode-side relay 203 are built in these relays, respectively. The exciting coil for the positive-electrode-side relay 201 is connected to current paths 12 and 16. The exciting coil for the precharge relay 202 is connected to current paths 13 and 17. The exciting coil for the negative-electrode-side relay 203 is connected to current paths 14 and 17. When an electric current is flowing through these current paths, each of these exciting coils generates a magnetic field with that electric current, thereby switching each corresponding really to an ON state. On the other hand, when the electric current is not flowing through these current paths, each exciting coil switches each corresponding relay to an OFF state. Consequently, each relay is switched depending on whether the electric current flowing through each current path exists or not.

The battery 3 which is a high voltage battery is configured by connecting a plurality of single batteries 301 in a serial-parallel manner. Each single battery 301 is configured by using, for example, a secondary battery such as a lithium-ion battery.

The vehicle control apparatus 4 is connected to various kinds of sensors and various kinds of actuators, which are mounted in the vehicle and are not illustrated in the drawing, and controls traveling of the vehicle by using these sensors and actuators. Furthermore, the vehicle control apparatus 4 has a relay control switch 401 inside itself. The relay control switch 401 is composed of three switches 401-1, 401-2, 401-3 which are connected to the positive-electrode-side relay 201, the precharge relay 202, and the negative-electrode-side relay 203 for the high voltage relay 2, respectively. One end side of the switch 401-1 is connected to the exciting coil for the positive-electrode-side relay 201 via the current path 12. One end side of the switch 401-2 is connected to the exciting coil for the precharge relay 202 via the current path 13. One end side of the switch 401-3 is connected to the exciting coil for the negative-electrode-side relay 203 via the current path 14. Each one of the other end sides of these switches is connected to the low-voltage power source 11 in the vehicle. Incidentally, the low-voltage power source 11 is, for example, an electrical system power source of a voltage 12V. The switching status of each switch in the relay control switch 401 is controlled by the vehicle control apparatus 4.

The battery control apparatus 5 is connected to connection points between the respective single batteries 301 of the battery 3 via a voltage detection line 19 and supervises the status of the battery 3 by detecting a voltage of each single battery 301. Furthermore, the battery control apparatus 5 has a relay control switch 501 inside itself. The relay control switch 501 is composed of: a switch 501-1 connected to the positive-electrode-side relay 201 of the high voltage relay 2; and a switch 501-2 connected to the precharge relay 202 and the negative-electrode-side relay 203. One end side of the switch 501-1 is connected to the exciting coil for the positive-electrode-side relay 201 via the current path 16. One end side of the switch 501-2 is connected to the exciting coil for the precharge relay 202 and the exciting coil for the negative-electrode-side relay 203 via the current path 17. Each one of the other end sides of these switches is connected a chassis GND 18 which is GND for the low-voltage power source 11. The switching status of the switches 501-1 and 501-2 is controlled by the battery control apparatus 5; and when the battery control apparatus 5 normally operates, the switches 501-1 and 501-2 are always switched to the ON state.

With the battery system according to this embodiment as described above, the three switches 401-1, 401-2, 401-3 of the relay control switch 401 are provided, in the current paths 12 to 14, closer to the low-voltage power source 11 than to the exciting coils for the respective relays in the high voltage relay 2, that is, on the high electric potential side. On the other hand, the switches 501-1 and 501-2 of the relay control switch 501 in the battery control apparatus 5 are provided, in the current paths 16, 17, closer to the chassis GND 18 than to the exciting coils for the respective relays in the high voltage relay 2, that is, on the low electric potential side. Therefore, the electric current is made to flow through the exciting coils via the respective current paths by switching these switches to the ON state, so that it becomes possible to switch each relay of the high voltage relay 2 to the ON state.

When the battery system in FIG. 1 is activated and the battery control apparatus 5 starts operating, the switches 501-1 and 501-2 in the relay control switch 501 are switched to the ON state. Furthermore, the switches 401-1 and 401-2 in the relay control switch 401 are switched to the ON state by the vehicle control apparatus 4. Consequently, the electric current flows through the current paths 12 and 16 and the positive-electrode-side relay 201 is switched to the ON state; and also the electric current flows through the current paths 13 and 17 and the precharge relay 202 is switched to the ON state. As a result, the inverter 1 and the battery 3 are connected in a state where an inrush current is reduced by the precharge resistor 204. Subsequently, when a smoothing capacitor inside the inverter 1 is charged to a certain voltage or higher, the switch 401-3 is switched to the ON state and the switch 401-2 is switched to the OFF state. Consequently, the electric current flows through the current paths 14 and 17 and the negative-electrode-side relay 203 is switched to the ON state; and also the electric current in the current path 13 is cut off and the precharge relay 202 is switched to the OFF state. As a result, the connection between the inverter 1 and the battery 3 is completed and the direct-current power is given and received between the inverter 1 and the battery 3.

Incidentally, in the example of the battery system illustrated in FIG. 1, the precharge relay 202 and the precharge resistor 204 are connected parallelly with the negative-electrode-side relay 203 between the minus-side wire 21 for the inverter 1 and the minus-side wire 23 for the battery 3. However, the precharge relay 202 and the precharge resistor 204 may be connected parallelly with the positive-electrode-side relay 201 between the plus-side wire 20 for the inverter 1 and the plus-side wire 22 for the battery 3. Furthermore, if the inrush current does not particularly cause any problem, the precharge relay 202 and the precharge resistor 204 may not be provided.

Let us assume here that whatever anomaly has occurred at the battery 3 or the battery control apparatus 5 after the completion of the connection between the inverter 1 and the battery 3. In this case, each switch of the relay control switch 401 is switched to the OFF state by the vehicle control apparatus 4. Furthermore, the battery control apparatus 5 switches the switches 501-1 and 501-2 of the relay control switch 501 to the OFF state. As a result, the electric current flowing through the current paths 12 and 16 is cut off and the positive-electrode-side relay 201 is switched to the OFF state; and the electric current flowing through the current paths 14 and 17 is cut off and the negative-electrode-side relay 203 is switched to the OFF state. Accordingly, the battery system according to this embodiment is designed to have a dual system for cutting off the connection between the inverter 1 and the battery 3, that is, a system of the relay control switch 401 in the vehicle control apparatus 4 and a system of the relay control switch 501 in the battery control apparatus 5. Therefore, even if a failure occurs in either one of the systems, it is possible to reliably prevent the battery 3 from becoming overcharged or overdischarged.

Figure 2:
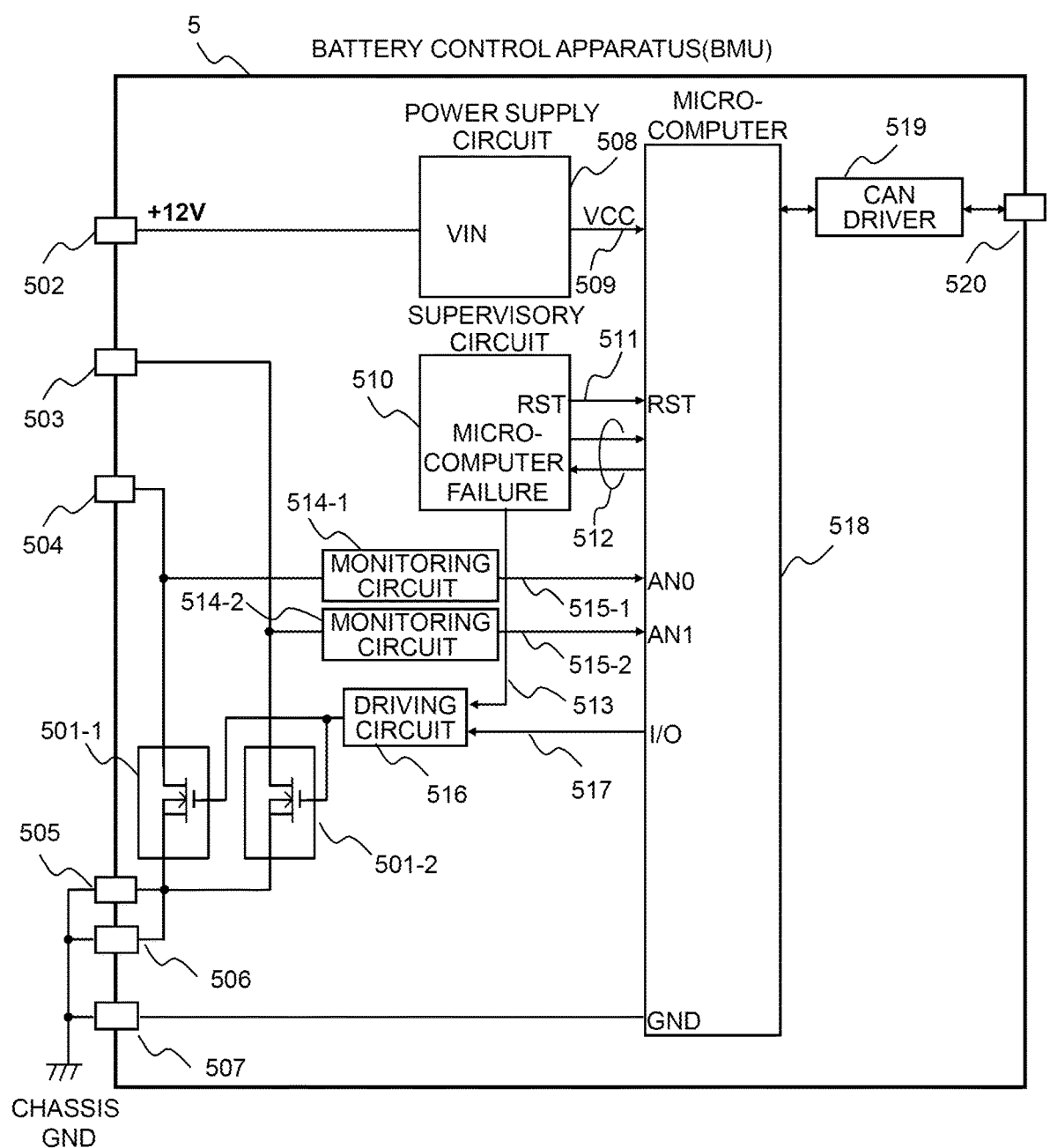
FIG. 2 is a diagram illustrating one example of an internal circuit for a battery control apparatus.

FIG. 2 is a diagram illustrating one example of an internal circuit for the battery control apparatus 5. The battery control apparatus 5 has the switches 501-1 and 501-2, which constitute the relay control switch 501 illustrated in FIG. 1, and also has respective terminates with the reference numerals 502 to 507 and 520, a power supply circuit 508, a supervisory circuit 510, monitoring circuits 514-1 and 514-2, a driving circuit 516, a microcomputer 518, and a CAN driver 519.

The terminal 502 is a terminal for inputting operating power supply for the battery control apparatus 5. The operating power supply which is input from the terminal 502 is converted into a voltage by the power supply circuit 508 and is output as a power source VCC for the microcomputer 518 as indicated with the reference numeral 509.

The terminals 503, 504 are connected to the current paths 16, 17 in FIG. 1, respectively. The switches 501-1 and 501-2 are connected, via the terminals 503, 504 and the current paths 16, 17 respectively, to the exciting coil for the positive-electrode-side relay 201, the exciting coil for the precharge relay 202, and the exciting coil for the negative-electrode-side relay 203 in FIG. 1, respectively.

Each of the terminals 505, 506, 507 is connected to the chassis GND 18. The switches 501-1 and 501-2 are respectively connected to the chassis GND 18 via the terminals 505 and 506. The microcomputer 518 is connected to the chassis GND 18 via the terminal 507.

Consequently, the battery control apparatus 5 is provided with a plurality of terminals (the terminals 503 and 504) for connecting to the exciting coils of the respective relays and a plurality of terminals (the terminals 505, 506, and 507) for connecting to the chassis GND 18. The reason is to have a configuration with sufficient capacity so that the electric current will not exceed a permissible current for each terminal. Furthermore, if a terminal current becomes high, there is a possibility that a voltage drop caused by contact resistance may cause adverse effects on circuit operations; and, therefore, it is also intended to prevent such adverse effects.

The supervisory circuit 510 is a circuit that supervises operations of the microcomputer 518 by inputting/outputting specified data to/from the microcomputer 518 via a signal line 512. For example, the supervisory circuit 510 supervises whether the microcomputer 518 operates abnormally or not, by supervising, for example, runaway of the microcomputer 518 or mismatches in arithmetic operations between dual cores if the microcomputer 518 is a microcomputer equipped with the dual cores. If any of these operational anomalies of the microcomputer 518 occurs, the supervisory circuit 510 resets the microcomputer 518 by outputting a reset signal 511 or outputs a microcomputer failure signal 513 to the driving circuit 516.

The monitoring circuits 514-1 and 514-2 monitor the status of the switches 501-1, 501-2 respectively and outputs the results to the microcomputer 518.

The driving circuit 516 switches each of the switches 501-1 and 501-2 to the ON state or the OFF state, depending on the driving signal 517 output from the microcomputer 518 or the microcomputer failure signal 513 output from the supervisory circuit 510. Specifically speaking, when the driving signal 517 is output from the microcomputer 518, the driving circuit 516 switches each of the switches 501-1 and 501-2 to the ON state. Furthermore, when the microcomputer failure signal 513 is output form the supervisory circuit 510, the driving circuit 516 switches each of the switches 501-1 and 501-2 to the OFF state, regardless of whether the driving signal 517 is output or not. Consequently, if an operational anomaly of the microcomputer 518 has occurred, each of the positive-electrode-side relay 201 and the negative-electrode-side relay 203 in FIG. 1 is switched to the OFF state, thereby cutting off the connection between the inverter 1 and the battery 3.

The terminal 520 is connected to the CAN communication line 15 indicated in FIG. 1. The CAN driver 519: converts data, which is output from the microcomputer 518, into a CAN signal and transmits the CAN signal to the CAN communication line 15 via the terminal 520; and also converts the CAN signal, which is received from the CAN communication line 15 via the terminal 520, into data and outputs the data to the microcomputer 518. The battery control apparatus 5 can communicate with the vehicle control apparatus 4 via the CAN communication line 15 by using the CAN signal by this CAN driver 519.

Incidentally, in the configuration example illustrated in FIG. 2, only one driving circuit 516 is provided for the switches 501-1 and 501-2; however, the driving circuit 516 may be provided for each of the switches.

Next, operating sequences of the battery system according to this embodiment will be explained below by using the respective flowcharts in FIGS. 3, 4, and 5.

Figure 3:
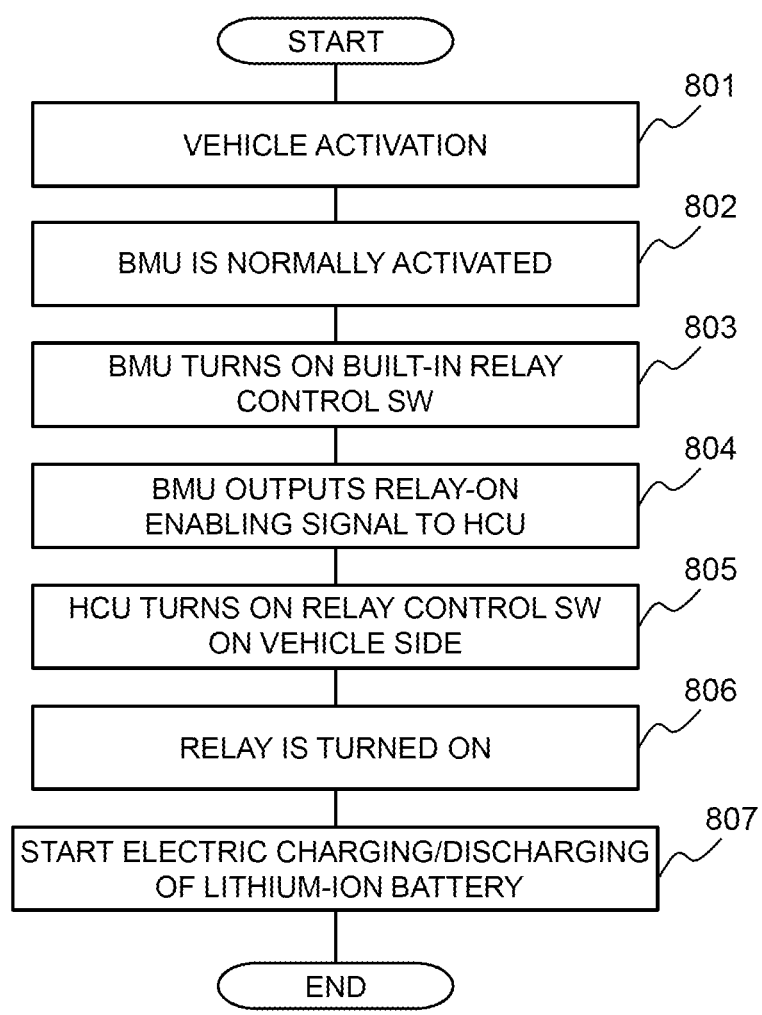
FIG. 3 is a flowchart illustrating an operating sequence when the battery control apparatus is normally activated.

FIG. 3 is a flowchart illustrating the operating sequence when the battery control apparatus 5 is activated normally. When the vehicle is activated in step 801 and the battery control apparatus 5 is activated normally in step 802, the battery control apparatus 5 outputs the driving signal 517 from the microcomputer 518 to the driving circuit 516 and thereby switches the built-in switches 501-1 and 501-2 to the ON state in step 803. Subsequently, in step 804, the battery control apparatus 5 outputs specified data from the microcomputer 518 to the CAN driver 519 and thereby outputs a relay-ON enabling signal, which is a CAN signal for permitting switching of the high voltage relay 2 to the ON state, to the vehicle control apparatus 4.

When receiving the relay-ON enabling signal transmitted from the battery control apparatus 5 in step 804, the vehicle control apparatus 4 switches each switch of the relay control switch 401 to the ON state in step 805. When this happens as described earlier, the switches 401-1 and 401-2 are firstly switched to the ON state; and after the smoothing capacitor in the inverter 1 is charged to a certain voltage or higher, the switch 401-3 is switched to the ON state and the switch 401-2 is switched to the OFF state. As the electric current flows through each current path according to switching of this relay control switch 401, the respective relays of the high voltage relay 2 are sequentially switched to the ON state in step 806 and electric charging/discharging of the battery 3 is started in step 807.

Figure 4:
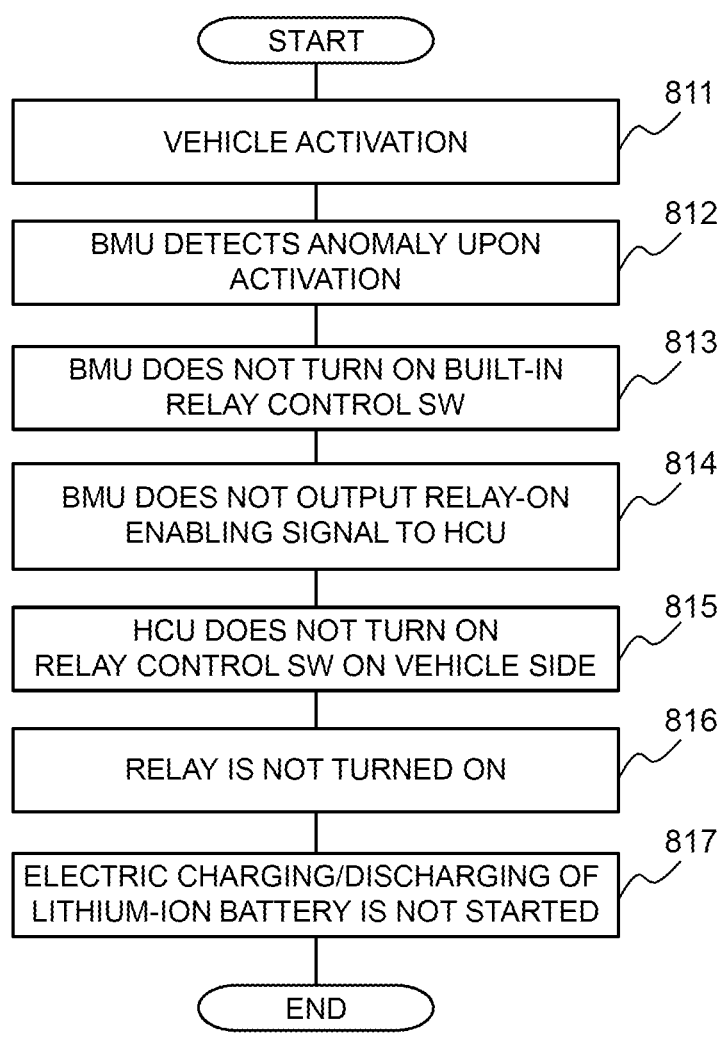
FIG. 4 is a flowchart illustrating an operating sequence when the battery control apparatus detects an anomaly upon its activation.

FIG. 4 is a flowchart illustrating the operating sequence when detecting an anomaly upon activation of the battery control apparatus 5. In this case, when the vehicle is activated in step 811, the battery control apparatus 5 detects the anomaly upon the activation in step 812. Incidentally, there may be various kinds of anomalies, including minor failures and critical failures, as the anomaly to be detected by the battery control apparatus 5; however, a critical failure for which the connection between the inverter 1 and the battery 3 should be cut off is particularly assumed here. This does not necessarily apply to any minor failure.

When the battery control apparatus 5 detects the anomaly in step 812, the battery control apparatus 5 does not output the driving signal 517 from the microcomputer 518 to the driving circuit 516 and thereby does not switch the built-in switches 501-1 and 501-2 to the ON state in step 813. Subsequently, in step 814, the battery control apparatus 5 does not output the specified data from the microcomputer 518 to the CAN driver 519 and thereby does not output the relay-ON enabling signal to the vehicle control apparatus 4.

Since the relay-ON enabling signal is not transmitted from the battery control apparatus 5 in step 814, the vehicle control apparatus 4 does not switch each switch of the relay control switch 401 to the ON state in step 815. As a result, each relay of the high voltage relay 2 is not switched to the ON state in step 816 and the electric charging/discharging of the battery 3 is not started in step 817.

Figure 5:
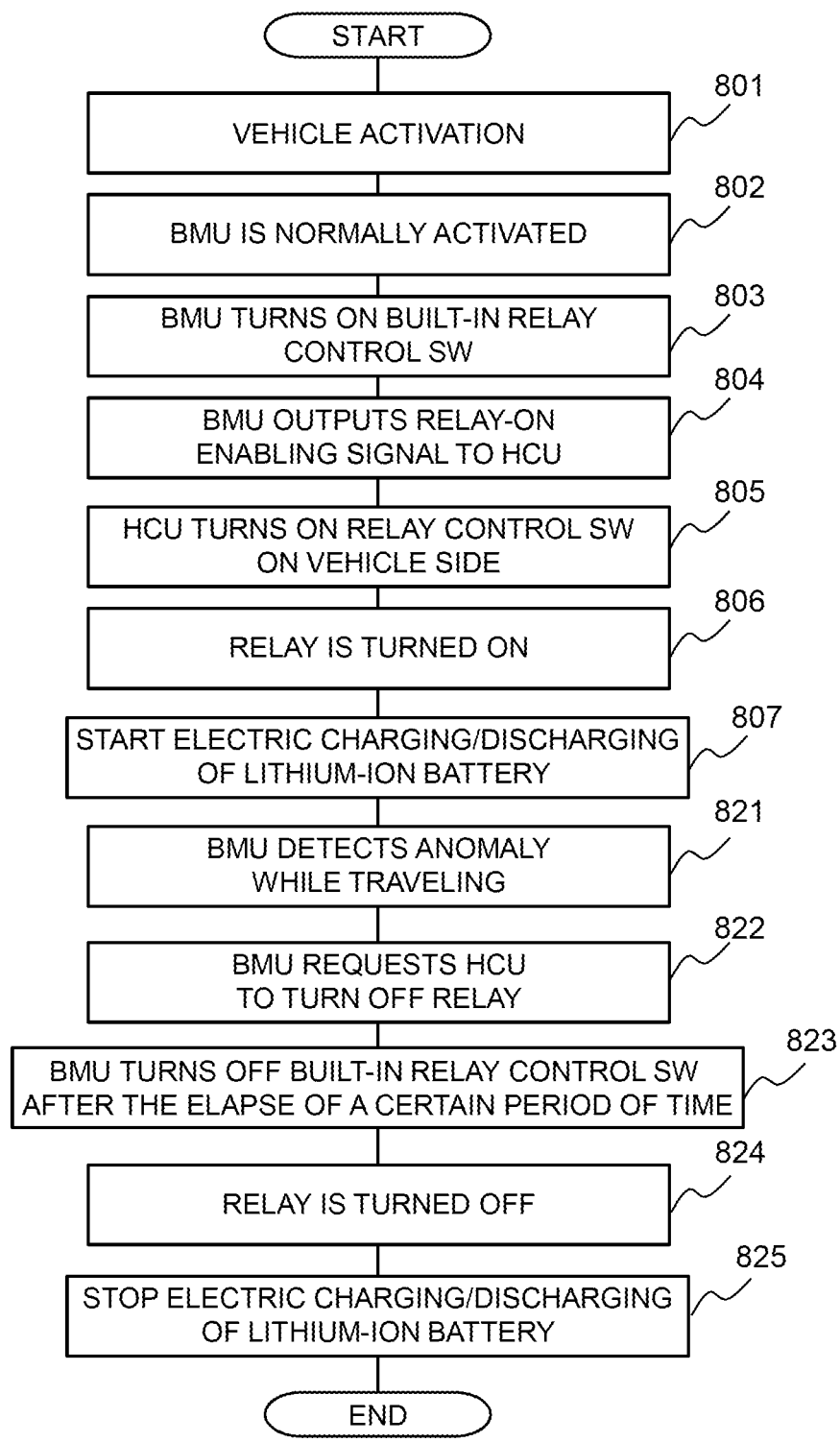
FIG. 5 is a flowchart illustrating an operating sequence when the battery control apparatus detects an anomaly after being activated normally.

FIG. 5 is a flowchart illustrating the operating sequence when the battery control apparatus 5 detects an anomaly after being activated normally. In this case, after the vehicle is activated in step 801, operations of the same details as those in FIG. 3 are conducted in steps 802 to 807, respectively, and then the electric charging/discharging of the battery 3 is started. Then, if the battery control apparatus 5 detects an anomaly in step 821 while the vehicle is traveling, the battery control apparatus 5 outputs specified data from the microcomputer 518 to the CAN driver 519 and thereby outputs a CAN signal, which requests switching of the high voltage relay 2 to the OFF state, to the vehicle control apparatus 4 in step 822. Subsequently in step 823, after the elapse of a certain period of time, the battery control apparatus 5 stops the output of the driving signal 517 from the microcomputer 518 to the driving circuit 516 and thereby switches the built-in switches 501-1 and 501-2 to the OFF state.

The vehicle control apparatus 4 switches each switch of the relay control switch 401 to the OFF state in response to the switching request transmitted from the battery control apparatus 5 for switching of the high voltage relay 2 to the OFF state in step 822, or the battery control apparatus 5 switches the switches 501-1 and 501-2 to the OFF state in step 823, so that the electric current flowing through each current path is cut off. As a result, each relay of the high voltage relay 2 is switched to the OFF state in step 824 and the electric charging/discharging of the battery 3 is stopped in step 825.

Second Embodiment

Figure 6:
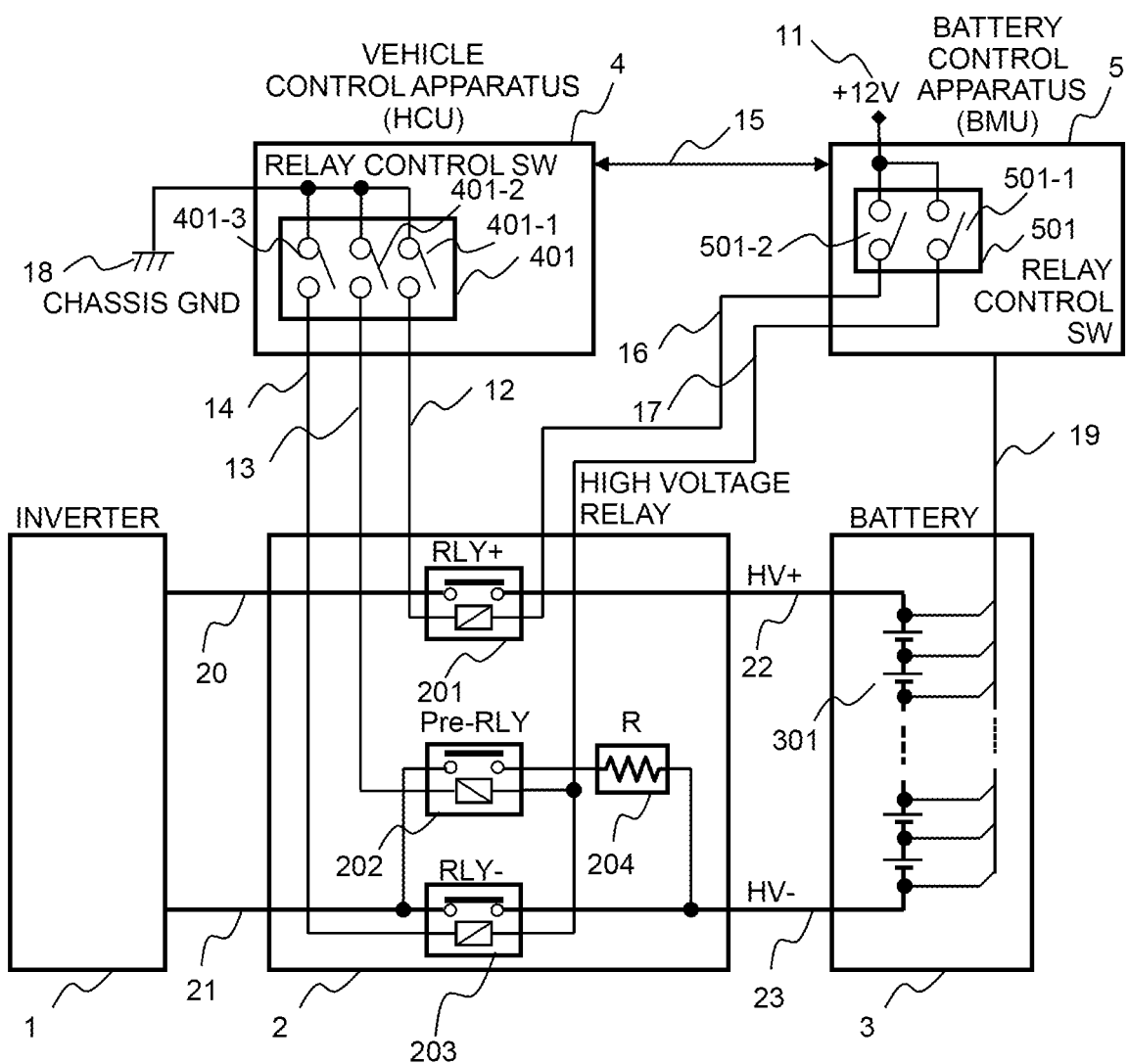
FIG. 6 is a diagram illustrating the configuration of a battery system according to a second embodiment of the present invention.

FIG. 6 is a diagram illustrating the configuration of a battery system including a battery control apparatus according to a second embodiment of the present invention. The battery system according to this embodiment has the following differences from the battery system according to the first embodiment illustrated in FIG. 1: the other end sides of the three switches 401-1, 401-2, 401-3, which are not connected to the exciting coils, in the relay control switch 401 provided in the vehicle control apparatus 4 are connected to the chassis GND 18; and the other end sides of the switches 501-1 and 501-2, which are not connected to the exciting coils, in the relay control switch 501 provided in the battery control apparatus 5 are connected to the low-voltage power source 11.

With the battery system according to this embodiment as described above, the three switches 401-1, 401-2, 401-3 of the relay control switch 401 in the vehicle control apparatus 4 are provided, in the current paths 12 to 14, at positions closer to the chassis GND 18 than to the exciting coils of the respective relays in the high voltage relay 2, that is, on the low electric potential side. On the other hand, the switches 501-1 and 501-2 of the relay control switch 501 in the battery control apparatus 5 are provided, in the current paths 16, 17, at positions closer to the low-voltage power source 11 than to the exciting coils of the respective relays in the high voltage relay 2, that is, on the high electric potential side. Therefore, similarly to the first embodiment, the electric current is made to flow through the exciting coils via the respective current paths by switching these switches to the ON state, so that it becomes possible to switch the respective relays of the high voltage relay 2 to the ON state.

Incidentally, a method for switching each switch according to this embodiment is similar to that explained in the first embodiment. Accordingly, the battery system according to this embodiment is also designed to have a dual system for cutting off the connection between the inverter 1 and the battery 3, that is, a system of the relay control switch 401 in the vehicle control apparatus 4 and a system of the relay control switch 501 in the battery control apparatus 5. Therefore, even if a failure occurs in either one of the systems, it is possible to reliably prevent the battery 3 from becoming overcharged or overdischarged.

The following operational advantages are implemented according to the above-described embodiments of the present invention.

(1) The battery system is connected to the inverter 1 mounted in a vehicle to give/receive the direct-current power to/from the inverter 1. This battery system includes the battery 3, the high voltage relay 2 for establishing or cutting off an electrical connection between the battery 3 and the inverter 1, a plurality of relay control switches 401 and 501 provided respectively in the current paths 12 to 14, 16, and 17 for switching the high voltage relay 2, and the battery control apparatus 5 that supervises a status of the battery. The relay control switch 501 is provided in the battery control apparatus 5 and the relay control switch 401 is provided in the vehicle control apparatus 4 for controlling traveling of the vehicle. The relay control switches 401 and 501 are serially connected to each other in the current paths 12 to 14, 16, and 17. The battery control apparatus 5 controls a status of switching the relay control switch 501 and the relay control switch 401 controls a status of switching the relay control switch 401. Consequently, even if a failure occurs at either one of the battery control apparatus 5 and the vehicle control apparatus 4 which respectively control the high voltage relay 2 establishing or cutting off the electrical connection the battery 3 and the inverter 1, it is possible to reliably prevent the battery 3 from becoming overcharged or overdischarged.

(2) The positive-electrode-side relay 201, the negative-electrode-side relay 203, and the precharge relay 202 are provided as the high voltage relay 2 between the battery 3 and the inverter 1. Sets of the relay control switches 401 and 501, that is, a set of the switch 401-1 and the switch 501-1, a set of the switch 401-2 and the switch 501-2, and a set of the switch 401-3 and the switch 501-2 are respectively provided corresponding to the respective relays mentioned above. Consequently, it is possible to establish or cut off the connection between the battery 3 and the inverter 1 safely and with certainty.

(3) One of the relay control switches 401 and 501 is connected to high electric potential sides of the current paths 12 to 14, 16, and 17 and the other one of the relay control switches 401 and 501 is connected to low electric potential sides of the current paths 12 to 14, 16, and 17. Consequently, the electric current flowing through the current paths 12 to 14, 16, and 17 can be cut off by switching either one of the switches to the OFF state, so that the high voltage relay 2 can be reliably caused to enter the OFF state.

(4) An exciting coil for each relay switching the high voltage relay 2, depending on whether the electric current flowing through the current paths 12 to 14, 16, and 17 exists or not, is provided in these current paths 12 to 14, 16, and 17. One of the relay control switches 401 and 501 is provided closer to the high electric potential side than to the exciting coil along the current paths 12 to 14, 16, and 17; and the other one of the relay control switches 401 and 501 is provided closer to the low electric potential side than to the exciting coil along the current paths 12 to 14, 16, and 17. Consequently, by switching the relay control switches 401 and 501 to the ON state, the electric current can be made to flow through the exciting coil and each relay of the high voltage relay 2 can be switched to the ON state.

(5) When the battery control apparatus 5 detects an anomaly (step 821), it transmits a cutoff request for cutting off the high voltage relay 2 to the vehicle control apparatus 4, that is, transmits a request for switching the high voltage relay 2 to the OFF state (step 822) and also switches the relay control switch 501 to the OFF state (step 823). When the vehicle control apparatus 4 receives this cutoff request, it switches the relay control switch 401 to the OFF state. Consequently, when an anomaly occurs, the high voltage relay 2 can be caused by the relay control switch 401 or 501 to enter the OFF state at least at either the battery control apparatus 5 or the vehicle control apparatus 4.

(6) The battery control apparatus 5 switches the relay control switch 501 to the OFF state after a specified amount of time after transmitting the cutoff request for cutting off the high voltage relay 2. Consequently, even if the vehicle control apparatus 4 cannot switch the relay control switch 401 to the OFF state due to a reason such as a failure, the high voltage relay 2 can be reliably set to the OFF state after the elapse of the specified amount of time.

The above-described embodiments and variations are just examples and the present invention is not limited to the content of these embodiments and variations unless the features of the invention are impaired. Various embodiments and variations have been described above; however, the present invention is not limited to the content of these embodiments and variations. If any changes are made within the scope not departing from the gist of the present invention, such changes are included within the scope of the present invention only if the changes can be thought of within the scope of the technical idea of the present invention.

The disclosure content of the following basic priority application is incorporated herein by reference: Japanese Patent Application No. 2019-214100 (filed on Nov. 27, 2019).

REFERENCE SIGNS LIST

1: inverter
2: high voltage relay
3: battery
4: vehicle control apparatus
5: battery control apparatus
11: low-voltage power source
12, 13, 14, 16, 17: current paths
15: CAN communication line
18: chassis GND
19: voltage detection line
20: plus-side wire for inverter
21: minus-side wire for inverter
22: plus-side wire for battery
23: minus-side wire for battery
201: positive-electrode-side relay
202: precharge relay
203: negative-electrode-side relay
204: precharge resistor
301: single battery
401, 501: relay control switches

The invention claimed is:

1. An in-vehicle battery system, which is a battery system connected to an inverter mounted in a vehicle to give and receive direct-current power to and from the inverter, comprising:
   a battery including a plurality of single batteries;
   a relay for establishing or cutting off an electrical connection between the battery and the inverter;
   a plurality of switches respectively provided in a current path for switching the relay; and
   a battery control apparatus that supervises a status of the battery based on a voltage detection line connected to each of the plurality of single batteries,
   wherein the plurality of switches include a first switch provided in the battery control apparatus and a second switch provided in a vehicle control apparatus which controls traveling of the vehicle;
   wherein the first switch and the second switch are serially connected to each other through the relay in the current path and configured for the relay to be switched to an OFF state by switching only one of the switches;
   wherein the battery control apparatus controls a status of switching the first switch; and
   wherein the vehicle control apparatus controls a status of switching the second switch.

2. The in-vehicle battery system according to claim 1,
   wherein the relay is provided in plurality between the battery and the inverter; and
   wherein a set of the first switch and the second switch is provided corresponding to each of the plurality of the relays.

3. The in-vehicle battery system according to claim 1,
   wherein one of the first switch and the second switch is a high-electric-potential-side switch connected to a high electric potential side of the current path; and
   wherein the other one of the first switch and the second switch is a low-electric-potential-side switch connected to a low electric potential side of the current path.

4. The in-vehicle battery system according to claim 3,
   wherein an exciting coil for switching the relay depending on whether an electric current flowing through the current path exists or not is provided in the current path;
   wherein one of the first switch and the second switch is provided closer to the high electric potential side than to the exciting coil along the current path; and
   wherein the other one of the first switch and the second switch is provided closer to the low electric potential side than to the exciting coil along the current path.

5. The in-vehicle battery system according to claim 1,
   wherein in response to detecting an anomaly, the battery control apparatus transmits a cutoff request for cutting off the relay to the vehicle control apparatus and switches the first switch to an OFF state; and
   wherein in response to receiving the cutoff request, the vehicle control apparatus switches the second switch to the OFF state.

6. The in-vehicle battery system according to claim 5,
   wherein the battery control apparatus switches the first switch to the OFF state after a specified amount of time after transmitting the cutoff request.

* * * * *